Dec. 23, 1930.  E. J. FORD  1,786,339
GAUGE
Filed Nov. 5, 1929
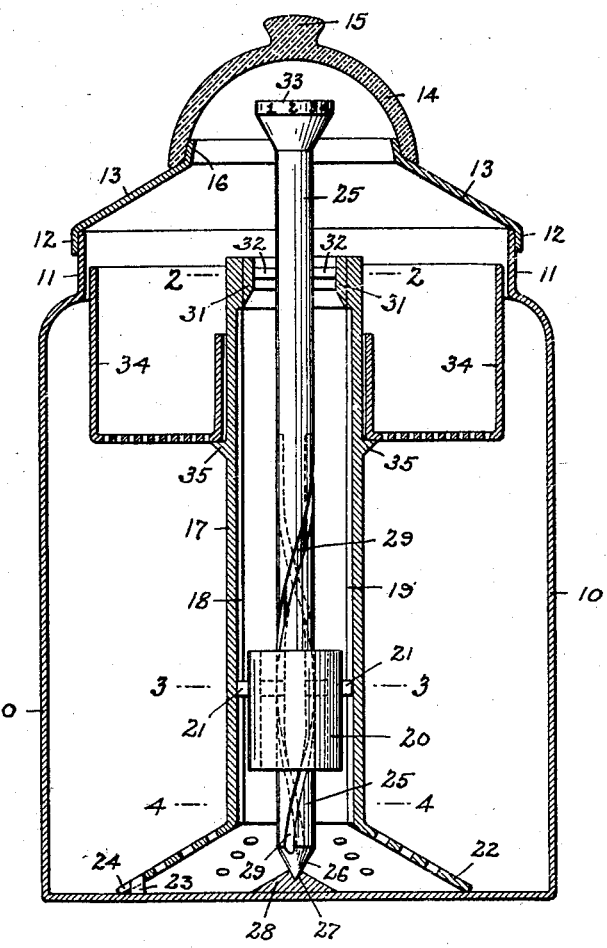
Fig. 1.
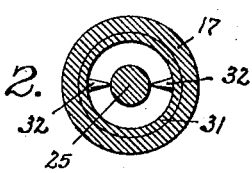
Fig. 2.
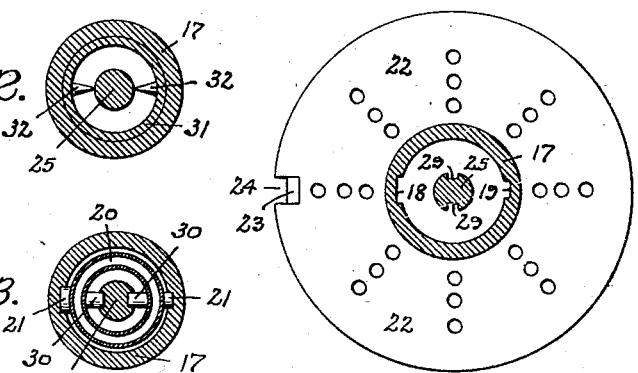
Fig. 3.
Fig. 4.
EDWARD J. FORD
INVENTOR
BY Victor J. Evans
ATTORNEY
WITNESS Lee Smith Patented Dec. 23, 1930

1,786,339

UNITED STATES PATENT OFFICE

EDWARD J. FORD, OF SPOKANE, WASHINGTON

GAUGE

Application filed November 5, 1929. Serial No. 404,963.

This invention relates to new and useful improvements in liquid level gauges more particularly adapted for use in conjunction with coffee pots and other vessels to determine the contents thereof by cupfuls.

Another object of the invention contemplates the provision and arrangement of a float operated gauge element.

An additional object of the invention consists of a slide connection between the float and gauge element whereby the latter will turn rather than reciprocate.

More specifically stated the float and gauge element are carried within the housing which connects with the float in such manner that the latter will be held against turning.

With the above and other objects in view, the invention further consists of the following novel features and details of construction, to be hereinafter more fully described, illustrated in the accompanying drawing and pointed out in the appended claims.

In the drawing:

Figure 1 is a vertical sectional view taken through a percolator with the invention applied.

Figure 2 is a horizontal sectional view taken on line 2—2 of Figure 1.

Figure 3 is a horizontal sectional view taken on line 3—3 of Figure 1.

Figure 4 is a sectional view taken on line 4—4 of Figure 1.

Referring to the drawing in detail wherein like characters of reference denote corresponding parts, the reference character 10 indicates the housing or body portion of the coffee pot or percolator including a reduced neck portion telescopically associated with the depending flange portion 12 of a closure lid 13 therefor. A transparent dome, indicated as at 14, having a knob or finger engaging portion 15 upon the upper portion thereof receives an upstanding annulus 16 upon the closure lid or top 13 in the manner suggested in Figure 1. The foregoing construction is conventional and forms no part of the present application for Letters-Patent but is merely mentioned for purposes of illustration in bringing forward the novel advantages of the case instant.

In carrying out the invention I provide a housing member 17 of tubular formation having wide and narrow oppositely disposed longitudinally extending grooves 18 and 19 respectively upon the inner side wall thereof. A float member 20 of hollow formation carries outwardly, laterally and oppositely projecting studs 21 upon the outer side wall thereof and which are dimensionally proportionate to the respective widths of the grooves 18 and 19 for sliding action therein. In order that the utmost proficiency of operation may be derived from the novel gauge equipped coffee pot or percolator the respective studs are worn in their respective grooves and by arranging one of the studs larger than the other it will be impossible to assemble the gauge in a wrongful manner. The tubular housing member 17 is supported at its lowermost end and extends as a continuation upon the upper portion of a frusto-conical shaped base member 22 foraminated in the manner suggested in Figures 1 and 4 of the drawing whereby the contents of the coffee pot or percolator will also seek its level within the tubular housing member. The base member 22 is preferably centrally disposed upon the bottom wall of the percolator or coffee pot and to facilitate precision as to centering, at all times, it is necessary to project or otherwise dispose an ear 23 carried upon the bottom wall of the percolator or coffee pot within a slot or cut-out portion 24 in the periphery of the base member 22.

The gauge element, referred to in the foregoing, is in the nature of a standard 25 having a pointed lowermost extremity mounted for rotary oscillatory movement within a pocket or socket opening 27 in a fixed bearing member 28 disposed upon the upper surface of the bottom wall for the percolator or coffee pot and within the confines of the base member 22. As shown, the standard or gauge element is provided with multiple longitudinally disposed spiral grooves 29 which receive trunnions 30 inwardly projecting from diametrically opposite sides of the inner side wall of the float.

From the foregoing description and accompanying drawing, it is understood that the fluctuating or change in the contents of the percolator or coffee pot will cause the float member to reciprocate and the standard or gauge element to rotate.

A sleeve member 31 positioned within the innermost end of the tubular housing member 17 is provided with inwardly and oppositely projecting pointed projections 32 engageable with the adjacent surface portions of the standard 25 to prevent tilting of the latter whereby binding action between the float and standard will not occur.

A gauge element in the nature of an enlargement or head 33 carried upon the uppermost end of the standard 25 and numerically calibrated at spaced intervals tangentially thereof is designed to indicate the contents of the percolator or coffee pot by cupfuls.

These calibrations may register with the handle or spout of the percolator or coffee pot reservoir or body.

A form of receptacle, indicated as at 34 and of conventional form, is provided with a foraminated or reticulated bottom through which the essence of the coffee grounds may drain into the body of the receptacle due to the percolating action of the boiling water boiling over the uppermost end of the tubular housing member 17. The receptacle 34 is seated upon the upper surface of an annular flanged support 35 encircling the outer portion of the tubular housing member 17 in the manner suggested in Figure 1 of the drawing.

The invention is susceptible of various changes in its form, proportions and minor details of construction, and the right is herein reserved to make such changes as properly fall within the scope of the appended claims.

Having described the invention, what is claimed is:—

1. A liquid level gauge for use within reservoirs and the like comprising a tubular housing member having a foraminated base member, a float disposed and mounted for reciprocating action within said housing, a gauge element extending centrally and longitudinally through the housing, pin and slot connections between the float, housing and gauge element respectively to impart rotary oscillatory movement to the gauge element, and an enlargement carried upon the uppermost visible portion of the gauge element calibrated at spaced intervals tangentially thereof to indicate the contents of the reservoir by known quantities.

2. A liquid level gauge for use within reservoirs and the like comprising a tubular housing member having a frusto-conical shaped foraminated base member adapted to seat upon the upper surface and bottom wall of a receptacle, a float disposed and mounted for reciprocating action within said housing, a gauge element extending centrally and longitudinally through the housing, pin and slot connections between the float, housing and gauge element respectively to facilitate the imparting of rotary oscillatory movement to the gauge element, an enlargement carried upon the uppermost visible portion of the gauge element being calibrated at spaced intervals tangentially thereof to indicate the contents of the reservoir by known quantities, and a bearing seat included within the bottom of the reservoir for the lowermost depending end of the gauge element.

3. A liquid level gauge for use within reservoirs and the like comprising a tubular housing member having a frusto-conical shaped foraminated base member adapted to seat upon the upper surface and bottom wall of a receptacle, a float disposed and mounted for reciprocating action within said housing, a gauge element extending centrally and longitudinally through the housing, pin and slot connections between the float, housing and gauge element respectively to facilitate the imparting of rotary oscillatory movement to the gauge element, an enlargement carried upon the uppermost visible portion of the gauge element being calibrated at spaced intervals tangentially thereof to indicate the contents of the reservoir by known quantities, a bearing seat included within the bottom of the reservoir for the lowermost depending end of the gauge element, and a sleeve member disposed within the uppermost end of the tubular housing member having inwardly and oppositely projecting portions engageable with the adjacent portions of the gauge element to preserve disposing of the latter in a vertical plane.

In testimony whereof I affix my signature.

EDWARD J. FORD.